(12) United States Patent
Oxley

(10) Patent No.: US 7,866,732 B2
(45) Date of Patent: *Jan. 11, 2011

(54) COMPACT CABLE DRIVE POWER SLIDING DOOR MECHANISM

(75) Inventor: Peter Lance Oxley, Mount Albert (CA)

(73) Assignee: Magna Closures Inc., Newmarket (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/528,641

(22) PCT Filed: Feb. 28, 2008

(86) PCT No.: PCT/CA2008/000389

§ 371 (c)(1),
(2), (4) Date: Aug. 26, 2009

(87) PCT Pub. No.: WO2008/104080

PCT Pub. Date: Sep. 4, 2008

(65) Prior Publication Data

US 2010/0043296 A1    Feb. 25, 2010

(51) Int. Cl.
*B60J 5/06* (2006.01)

(52) U.S. Cl. .............. 296/155; 296/146.4; 49/352; 49/360

(58) Field of Classification Search .............. 296/146.4, 296/155; 49/360, 352
See application file for complete search history.

(56) References Cited

U.S. PATENT DOCUMENTS

| 4,640,050 A | 2/1987 | Yamagishi et al. |
| 5,074,077 A | 12/1991 | Toyoshima et al. |
| 5,138,795 A | 8/1992 | Compeau et al. |
| 5,316,365 A | 5/1994 | Kuhlman et al. |
| 5,319,881 A | 6/1994 | Kuhlman |
| 5,833,301 A | 11/1998 | Watanabe et al. |
| 5,982,169 A | 11/1999 | Furlani et al. |
| 5,992,919 A | 11/1999 | Menke |
| 6,087,794 A | 7/2000 | Kwanobe |
| 6,125,586 A | 10/2000 | Buscher |
| 6,152,519 A | 11/2000 | Blank et al. |
| 6,390,535 B1 | 5/2002 | Champman |
| 6,460,295 B1 | 10/2002 | Johnson et al. |

(Continued)

FOREIGN PATENT DOCUMENTS

EP    1405978 B1    4/2004

(Continued)

*Primary Examiner*—Patricia L Engle
(74) *Attorney, Agent, or Firm*—Clark Hill P.L.C.

(57) ABSTRACT

A sliding door drive assembly for a motor vehicle having a sliding door includes a transmission operatively connected to a motor for transmitting a rotating force to an output shaft. A cable drum is fixedly secured to the output shaft and rotates therewith. First and second cables are wound about the cable drum in opposite directions. The first cable extends from the cable drum forward along the sliding door. The second cable extends from the cable drum rearward along the sliding door. Support guides extend tangentially out from the cable drum to guide the first and second cables outwardly and away from the cable drum along a path minimizing frictional forces. Front and rear pulley assemblies are mounted to the motor vehicle and are operatively coupled to the first and second cables between the sliding door drive assembly and the sliding door for tensioning the first and second cables.

29 Claims, 7 Drawing Sheets

U.S. PATENT DOCUMENTS

| | | |
|---|---|---|
| 6,553,719 B1 | 4/2003 | Stone et al. |
| 6,646,398 B1 * | 11/2003 | Fukazawa et al. ........... 318/445 |
| 6,802,154 B1 | 10/2004 | Holt et al. |
| 6,866,250 B2 | 3/2005 | Kita |
| 7,175,228 B2 * | 2/2007 | Mrkovic et al. ............. 296/155 |
| 2002/0043818 A1 | 4/2002 | Fukumoto et al. |
| 2003/0189196 A1 | 10/2003 | Kita |
| 2004/0003542 A1 * | 1/2004 | Shimada et al. ............... 49/360 |
| 2004/0216383 A1 | 11/2004 | Rogers, Jr. et al. |
| 2005/0039404 A1 * | 2/2005 | Mrkovic et al. ............... 49/360 |
| 2006/0150515 A1 * | 7/2006 | Shiga ......................... 49/360 |
| 2009/0019776 A1 * | 1/2009 | Ohtaki et al. ................. 49/360 |

FOREIGN PATENT DOCUMENTS

| | | |
|---|---|---|
| EP | 1548221 A2 | 6/2005 |
| JP | 2004100345 | 4/2002 |
| WO | 0053878 | 9/2000 |
| WO | 0066866 | 11/2000 |

\* cited by examiner

COMPACT CABLE DRIVE POWER SLIDING DOOR MECHANISM

BACKGROUND OF THE INVENTION

1. Field of the Invention

The invention relates to sliding door assemblies for motor vehicles. More specifically, the invention relates to a power sliding door drive assembly for automatically moving a sliding door between an open position and a close position for a motor vehicle.

2. Description of Related Art

In various types of motor vehicles, including minivans, delivery vans, and the like, it has become common practice to provide a vehicle body with relatively large side openings that are located immediately behind front doors and which are opened and closed with a sliding door. The sliding doors are typically mounted with hinges on horizontal tracks on the vehicle body for guided sliding movement between a close position flush with the vehicle body closing the side opening and an open position located outward of and alongside the vehicle body rearward of the side opening. The sliding doors may be operated manually or with a power drive assembly. When there is a power drive assembly for the sliding door, the power drive assembly works electronically by activating a switch within the motor vehicle or by activating a remote, typically located on a key fob. These power drive assemblies are becoming more and more popular. Although having the ability to press a button and open a sliding door is convenient, there are certain disadvantages.

In a standard arrangement of a power drive assembly a pair of cable sections, which may be separate or part of a common cable, each have one end anchored on the sliding door and an opposite end anchored on a cable drum. The cable sections are wound about the cable drum in opposite directions. The cable drum is axially mounted on a shaft or drive pin which is rotated by a reversible electric motor in a first or second direction depending on whether the sliding door is to be opened or closed. Rotation of the cable drum winds one cable section onto the cable drum and pays the other cable section off the cable drum.

In order to preserve the cable, the cable drum is formed with helical grooves intended to receive the respective cable section when it is wound thereon. It is important that the cable wind-up smoothly, without turns one atop the other, so that the cable itself does not chafe and prematurely wear out, and in order to keep the assembly as compact as possible.

The problem with this arrangement is that the cable is pulled at an angle at least toward the end of a windup operation and at the beginning of an unwind operation, so it is fairly common for the cable to jump out of its groove, causing a chafing problem and possibly leading to binding of the cable drum. It is, therefore, desirable to provide a sliding door drive assembly including support guides extending from a cable drum to guide first and second cables toward and away from the cable drum during operation of the sliding door drive assembly. It is also desirable to provide a sliding door drive assembly including a position sensor to monitor the position of the sliding door.

SUMMARY OF THE INVENTION

According to one aspect of the invention, a sliding door drive assembly for moving a sliding door includes front and rear pulleys that are biased away from the drive assembly for tensioning a cable extending between the drive assembly and the door.

According to another aspect of the invention, a tensioner includes a pulley rotatably journaled on a shaft disposed in a housing, a pair of end caps receiving opposite ends of the shaft slidably disposed in opposing grooves formed in the housing, and a pair of springs extending between the end caps and the housing.

According to another aspect of the invention, a sliding door drive assembly for moving a sliding door includes an absolute position encoder having sensors for sensing a rotational position of a magnet that rotates no more than once for full travel of the door and thus correlates to a position of the door.

According to another aspect of the invention, an absolute position encoder includes sensors for sensing a rotational position of a magnet that rotates no more than once for full travel of a door such that the rotational position of the magnet correlates to a position of the door.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
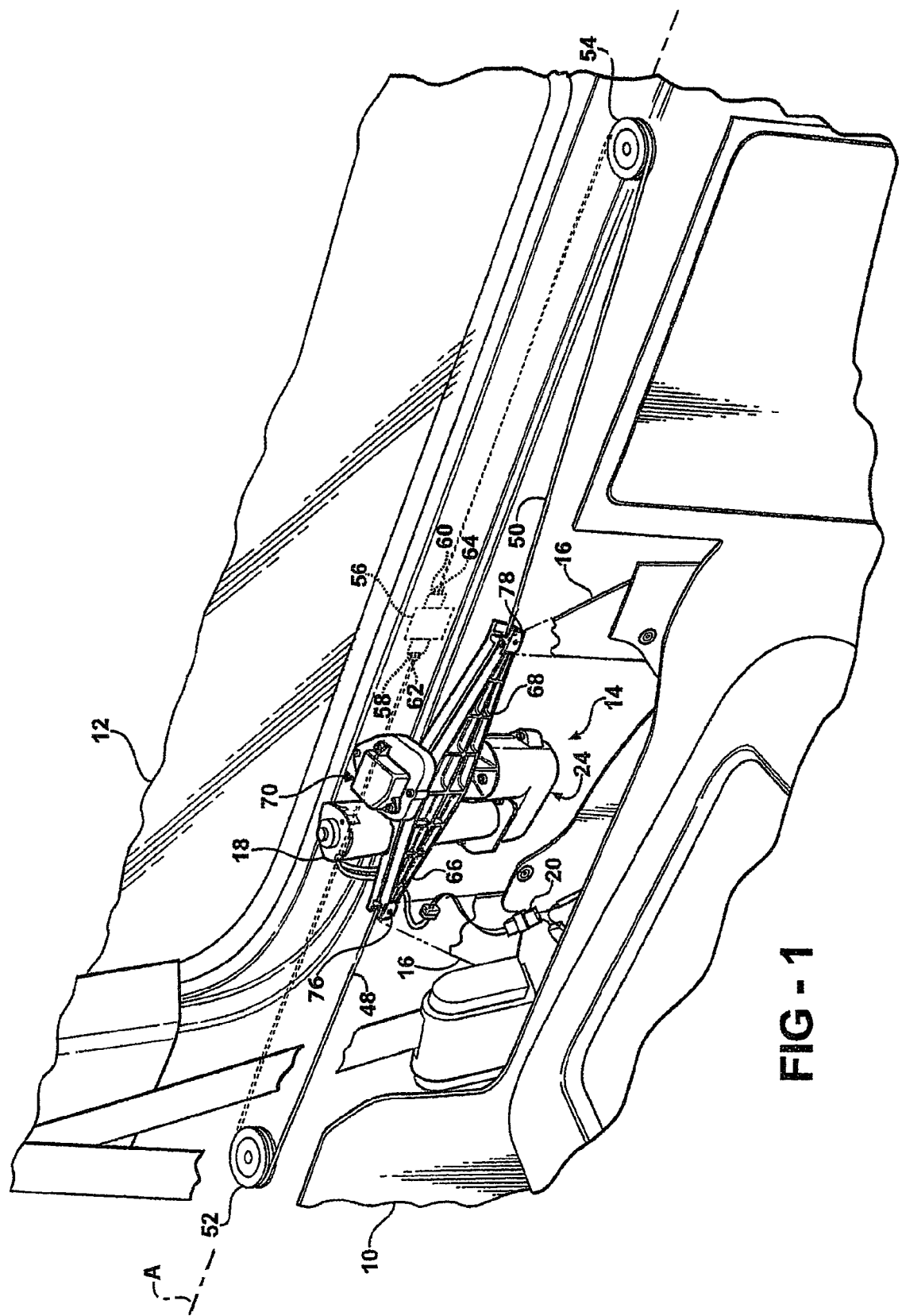
FIG. 1 is a fragmentary, perspective view of an interior portion of a motor vehicle including a sliding door drive assembly according to a first embodiment of the invention.

Referring to FIG. 1, a motor vehicle 10 is shown partially cutaway. The motor vehicle 10 includes a sliding door 12, also partially cutaway. A sliding door drive assembly, generally shown at 14, is mounted to the motor vehicle 10 and is operatively connected to the sliding door 12. Mounting brackets 16 mount the sliding door drive assembly 14 to the motor vehicle 10. It is appreciated that the mounting brackets may actually be another structure of the motor vehicle 10 having functions other than mounting the sliding door drive assembly 14 thereto.

The sliding door drive assembly 14 includes a motor 18 that is electrically connected to an electric energy source, graphically represented by an electric plug 20. It is contemplated that the motor 18 would operate using electric energy that is standard in a motor vehicle protocol. The motor 18 is bidirectional allowing for rotation of an output shaft 22 (FIG. 3) in two directions. The output shaft 22 is shown as the output shaft of a transmission, generally indicated at 24.

Figure 3:
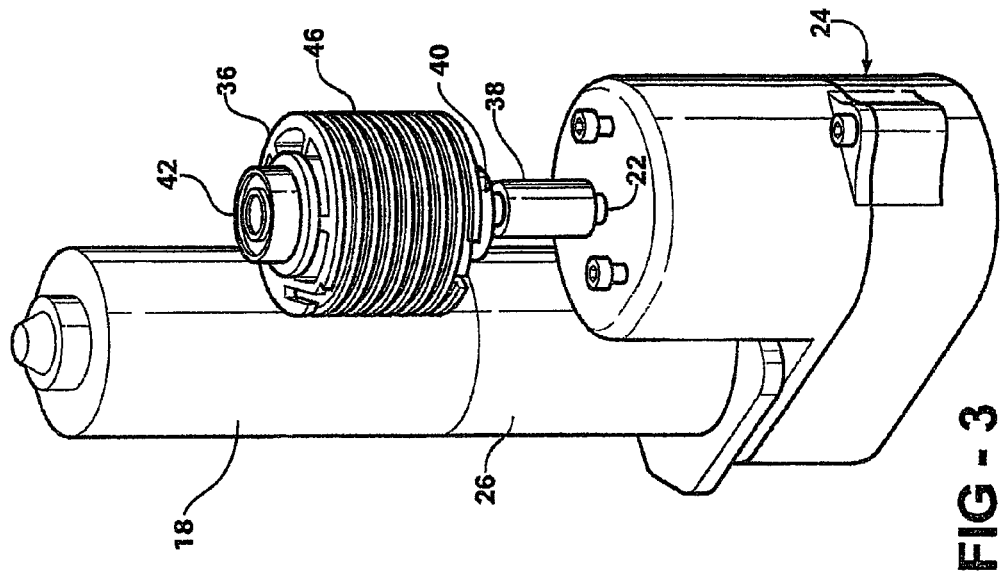
FIG. 3 is a perspective view of a portion of the sliding door drive assembly with the support guides removed.
Figure 2:
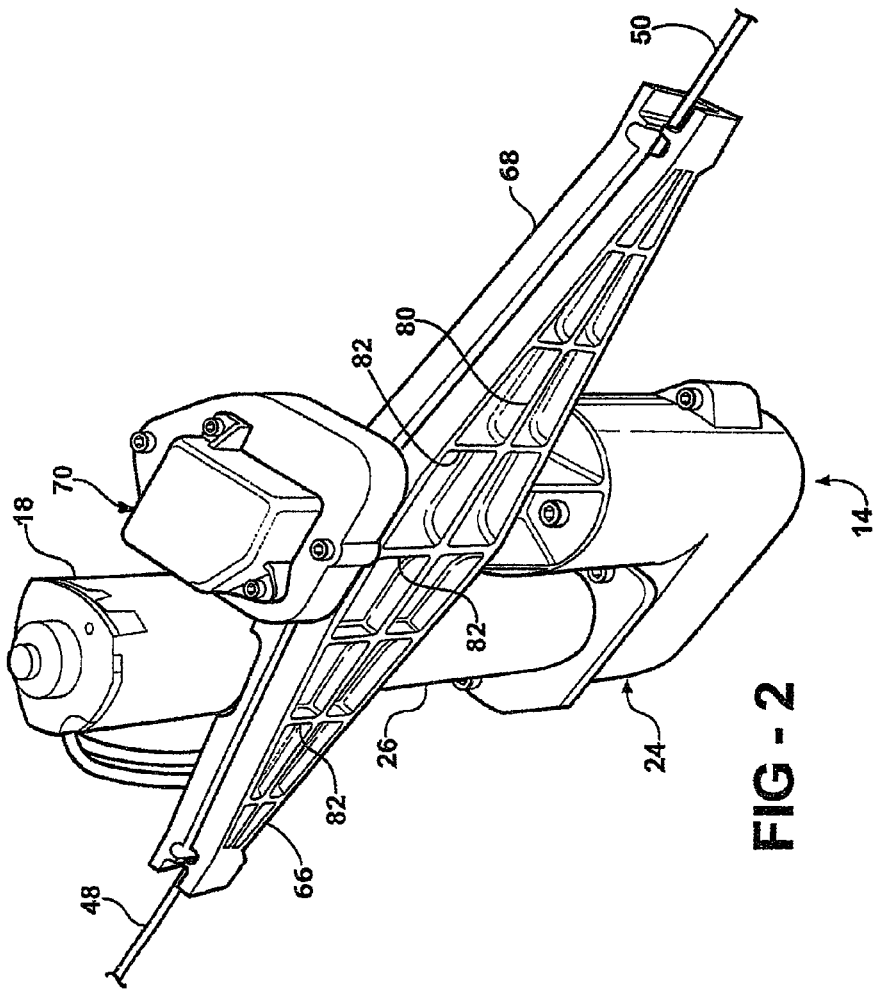
FIG. 2 is a perspective view of the sliding door drive assembly including support guides.
Figure 4:
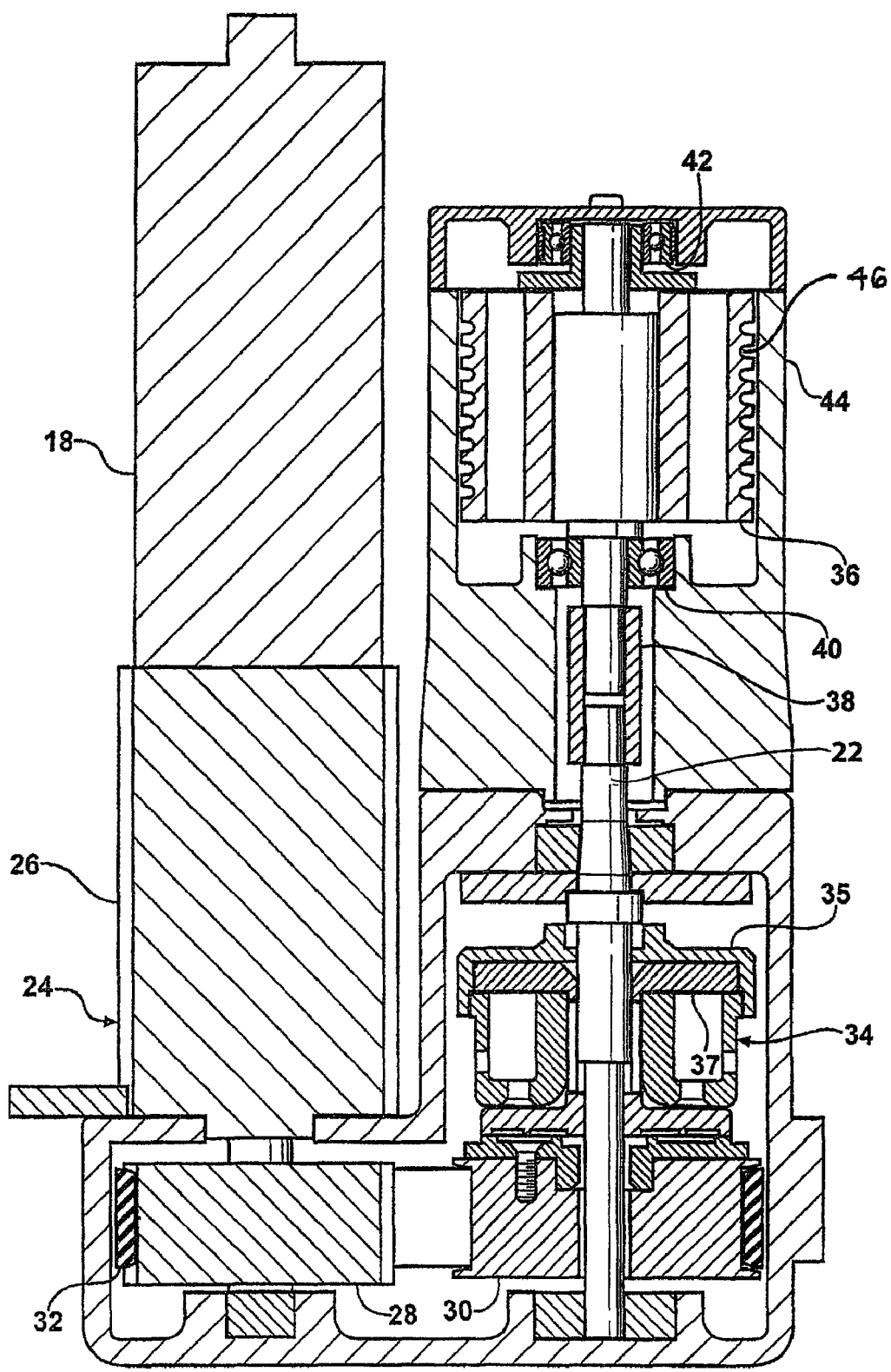
FIG. 4 is a cross-sectional side view of a portion of the sliding door drive assembly with the support guides removed.

Referring to FIGS. 2 through 4, the transmission 24 is operatively connected to the motor 18 and transmits the rotating force of the motor 18 to the output shaft 22. The transmission 24 includes a gear set 26 inline with the motor 18 and used to provide the necessary mechanical advantage to translate the rotational output of the motor 18 into something suitable for the sliding door drive assembly 14 so that the sliding door 12 is able to move between a fully open position and a fully close position in the direction of a longitudinal axis shown at A in FIG. 1. The transmission 24 includes two toothed belt pulleys 28, 30 and a toothed belt 32 extending thereabout. One of the belt pulleys 28 rotates with the gear set 26 about a first axis. The other belt pulley 30 rotates about with the output shaft about a second axis. The second axis is different from the first axis. The toothed belt pulleys 28, 30 are used to change the direction of the rotational output of the motor 18. This facilitates the compact packaging of the sliding door drive assembly 14 by having the rotational force turned back to a position that minimizes the length requirement of the sliding door drive assembly 14. The toothed belt 32 is used to dampen vibrations extending between the electric motor 18 and the sliding door 12.

Referring to FIG. 4, the transmission 24 also includes a clutch, generally indicated at 34. The clutch 34 allows the sliding door 12 to be disengaged from the motor 18. The clutch 34 reduces the effort required to manually move the sliding door 12 should such manual movement be desired as opposed to having the sliding door drive assembly 14 operate the sliding door 12 between its fully open and fully close positions. The clutch 34 includes a pair of toothed plates 35, 37. The toothed plates 35, 37 are used to minimize the space required by the clutch 34. More specifically, the clutch 34 has a reduced diameter due to the fact that the plates 35, 37 utilized by the clutch 34 are toothed.

The sliding door drive assembly 14 includes a cable drum 36 that is coupled to the clutch 34 with a coupling 38. The cable drum 36 is held in place by two sets of bearings 40, 42 that are fixedly secured to a cable drum housing 44. The cable drum 36 includes a helical groove 46 about which first 48 and second 50 cables are wound. The first 48 and second 50 cables are wound about the cable drum 36 in the helical groove 46 in opposite directions. Referring to FIG. 1, the first cable 48 extends from the cable drum 36 forward in the direction of the longitudinal axis A to a front pulley 52 whereafter the first cable 48 is redirected back toward the sliding door 12. The second cable 50 extends from the cable drum 36 rearward in the direction of the longitudinal axis A to a rear pulley 54 whereafter the second cable 50 is redirected back toward the sliding door 12. The first 48 and second 50 cables are each fixedly secured to a center hinge 56, which is fixedly secured to the sliding door 12. Rotation of the cable drum 36 winds one of the first 48 and second 50 cables and, at the same time, pays out the other of the first 48 and second 50 cables.

The center hinge 56 includes forward 58 and rearward 60 cable terminals for securing the first 48 and second 50 cables thereto, respectively. The forward 58 and rearward 60 cable terminals include respective forward 62 and rearward 64 cable tensioners. The forward 62 and rearward 64 cable tensioners tension the respective first 48 and second 50 cables.

The cable drum housing 44 includes support guides 66, 68 that extend out from the cable drum 36 and the cable drum housing 44 tangentially to the cable drum 5 36. The support guides 66, 68 guide the first 48 and second 50 cables outwardly and away from the cable drum 36 along a path that minimizes frictional forces. The support guides 66, 68 define a path for the first 48 and second 50 cables that minimizes frictional forces by minimizing the number of pulleys that would be required to redirect the path of the cable. This reduces parts as well as the frictional forces required to overcome the sliding door drive assembly 14. It is contemplated that the support guides 66, 68 also help guide the first 48 and second 50 cables onto and off of the cable drum 36 during operation of the sliding door drive assembly 14, which prevents the cable from jumping out of the helical groove 46. It will be appreciated that the cable is parallel to a helix angle, shown as α in FIG. 5, of the helical groove 46 of the cable drum 36 when the sliding door 12 is at the centre of travel.

The support guides 66, 68 also include mounting apertures 76, 78 that are used to have the sliding door assembly 14 mounted to the motor vehicle 10 with the mounting brackets 16. The support guides 66, 68 provide structural support for the sliding door drive assembly 14 and support the sliding door drive assembly 14 with all its integral parts. The support guides 66, 68 include reinforced ribs 80, 82 to provide additional rigidity to the sliding door drive assembly 14.

Figure 5:
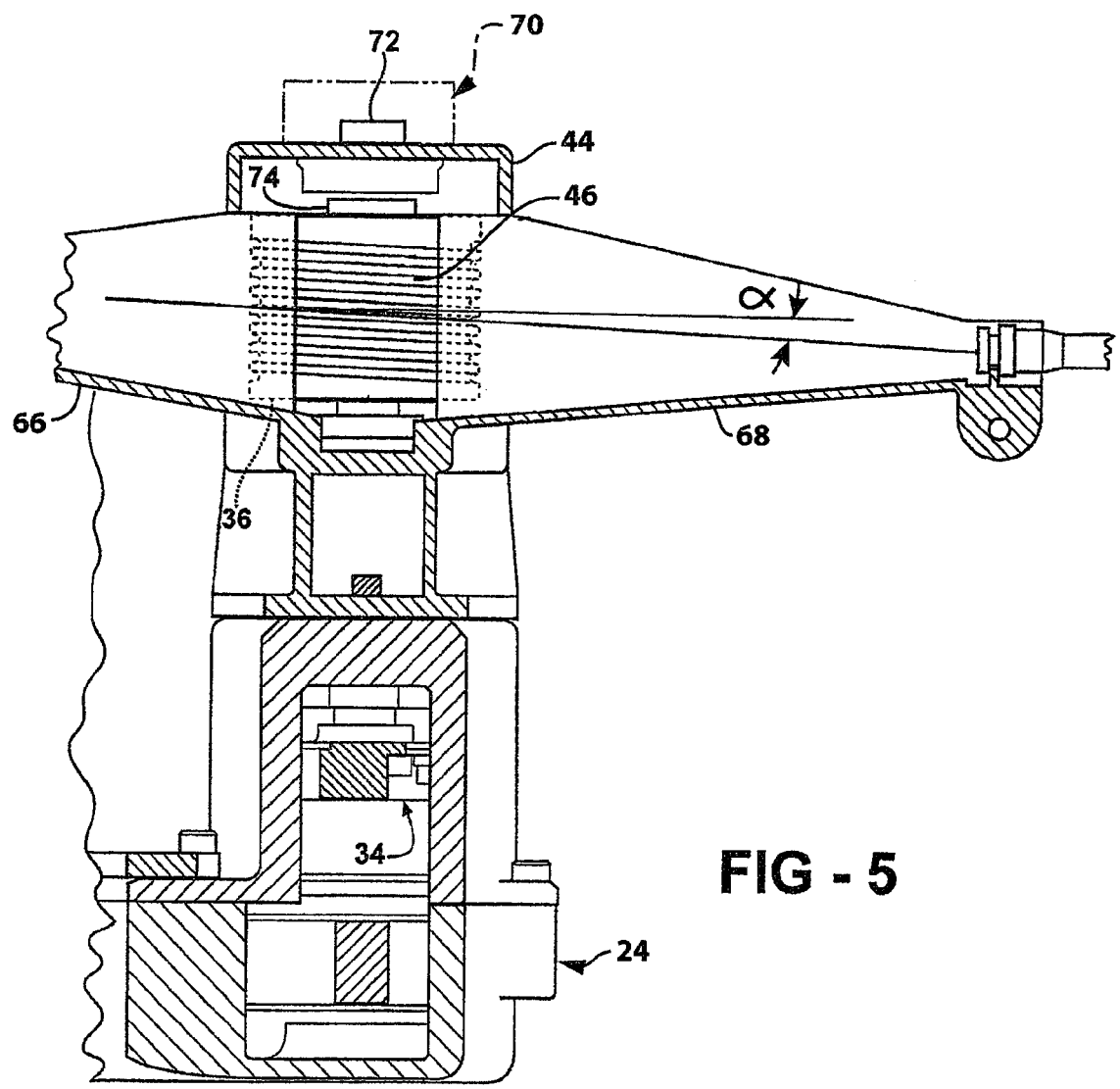
FIG. 5 is a cross-sectional side view of a portion of the sliding door drive assembly.

Referring to FIG. 5, a position sensor, generally indicated at 70, is mounted to the cable drum housing 44 for identifying the rotational position of the cable drum 36. The position sensor 70 is a very high resolution position sensor and includes a sensor 72 that senses the orientation of a magnet 74, which is fixedly secured to the cable drum 36 and rotates therewith.

Figure 6:
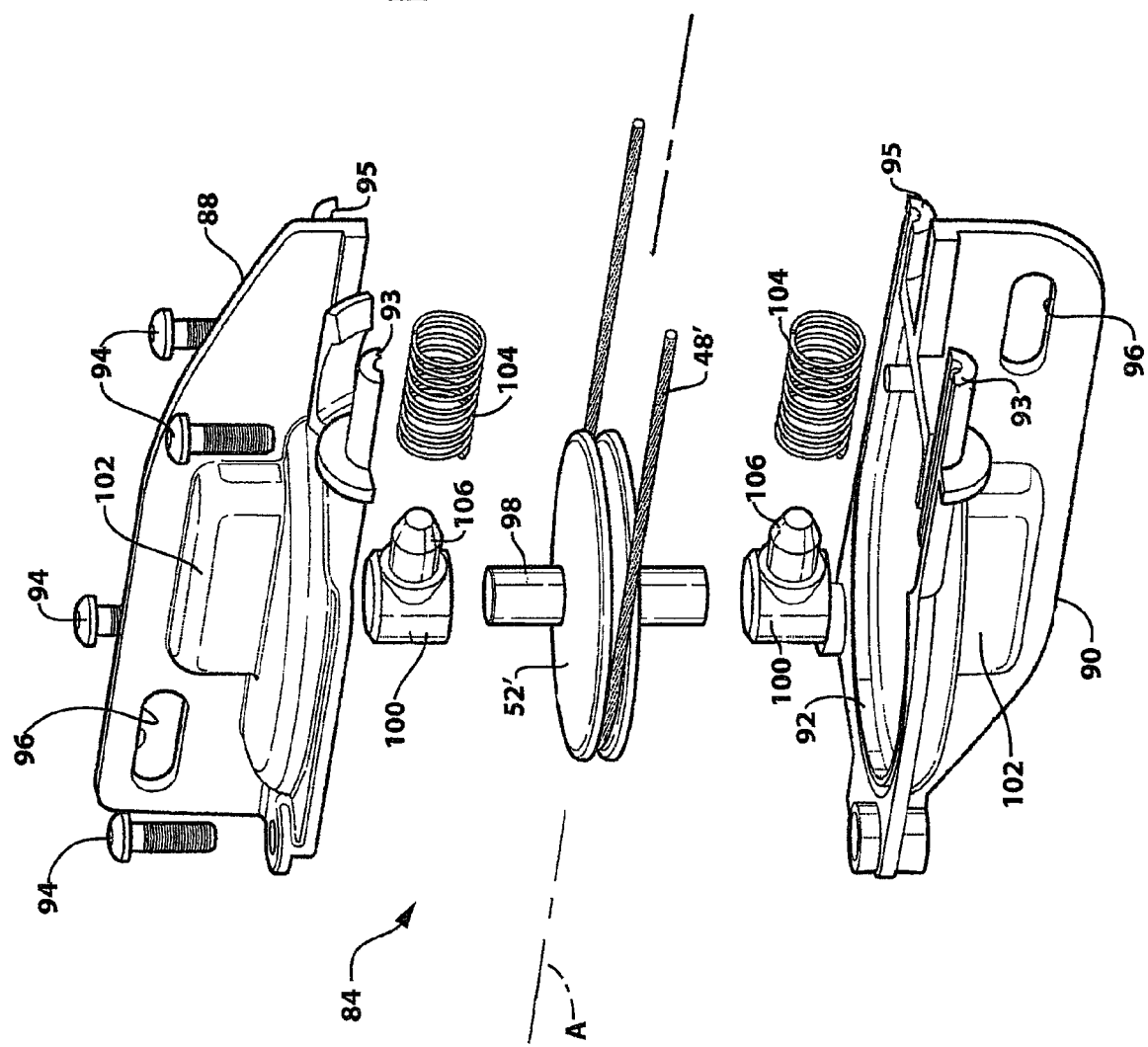
FIG. 6 is an exploded perspective view of a spring-loaded front pulley assembly according to a second embodiment of the invention.
Figure 7:
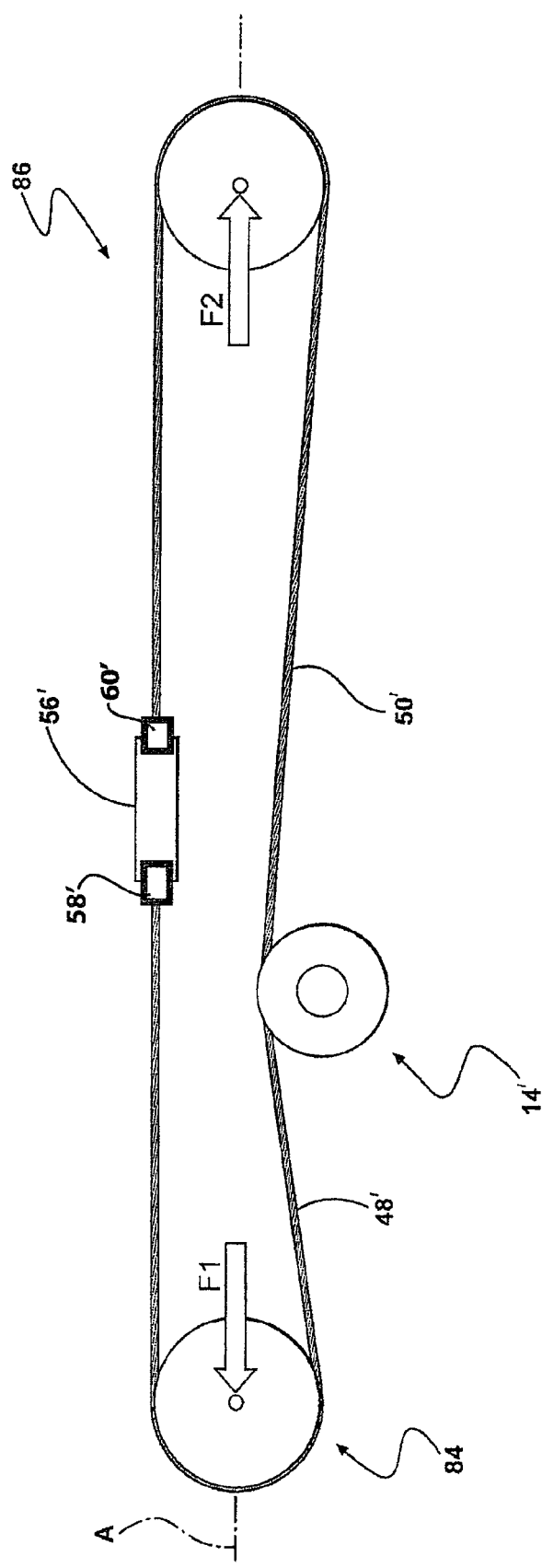
FIG. 7 is a schematic illustrating cable tensioning forces provided by the spring-loaded front pulley assembly and a spring-loaded rear pulley assembly.

Referring to FIGS. 6 and 7, wherein like primed reference numerals represent similar elements as those described above, in a second embodiment of the invention the forward 58' and rearward 60' cable terminals of the center hinge 56' do not include cable tensioners as disclosed in the first embodiment. Rather, the sliding door drive assembly 14' includes a spring-loaded front pulley assembly, generally shown at 84, and a spring-loaded rear pulley assembly, generally shown at 86. The front 84 and rear 86 pulley assemblies tension the respective first 48' and second 50' cables as described below.

While only the front pulley assembly 84 is shown in detail, it will be appreciated that both the front 84 and rear 86 pulley assemblies are substantially the same. In the embodiment shown, each of the front 84 and rear 86 pulley assemblies include an upper housing portion 88 and a lower housing portion 90. When the upper 88 and lower 90 housing portions are assembled a cavity 92 is formed therebetween for receiving one of the front 52' and rear 54' pulleys. The upper 88 and lower 90 housing portions define openings 93, 95 for guiding the respective first 48' and second 50' cables into and out of the cavity 92. The upper 88 and lower 90 housing portions are fixedly secured together using a plurality of fasteners 94, such as screws, bolts, or rivets. The upper 88 and lower 90 housing portions are adapted to be fixedly secured to the motor vehicle 10'. More specifically, the upper 88 and lower 90 housings each include an aperture or slot 96 for receiving a fastener (not shown) therethrough for fixedly securing the respective front 84 and rear 86 pulley assemblies to the motor vehicle 10'. The slot 96 is elongated allowing for positional adjustment of the respective front 84 and rear 86 pulley assemblies in the direction of the longitudinal axis A.

Referring to the front pulley assembly 84, the front pulley 52' is disposed in the cavity 92 between the upper 88 and lower 90 housing portions. The front pulley 52' is rotatably journaled on a shaft 98. A pair of opposing end caps 100 receives opposite ends of the shaft 98. The end caps 100 are disposed in a pair of opposing grooves 102 formed in the respective upper 88 and lower 90 housing portions extending in the direction of the longitudinal axis A. The end caps 100 are sidably movable along the grooves 102 in the direction of the longitudinal axis A.

A coil spring 104 extends between each of the end caps 100 and the respective upper 88 and lower 90 housing portion. In the embodiment shown, each end cap 100 includes a post 106 extending therefrom for axially receiving a first end of one of the springs 104. It will be appreciated that the respective upper 88 and lower 90 housing portion may include a similar post extending therefrom for axially receiving a second end of one of the springs 104. The springs 104 bias the front pulley 52' forward toward a front end of the motor vehicle 10', as shown by arrow F1 in FIG. 7, thereby tensioning the first cable 48'. Similarly, with respect to the rear pulley assembly 86, the springs 104 bias the rear pulley 54' rearward toward a rear end of the motor vehicle 10', as shown by arrow F2 in FIG. 7, thereby tensioning the second cable 50'.

Figure 8:
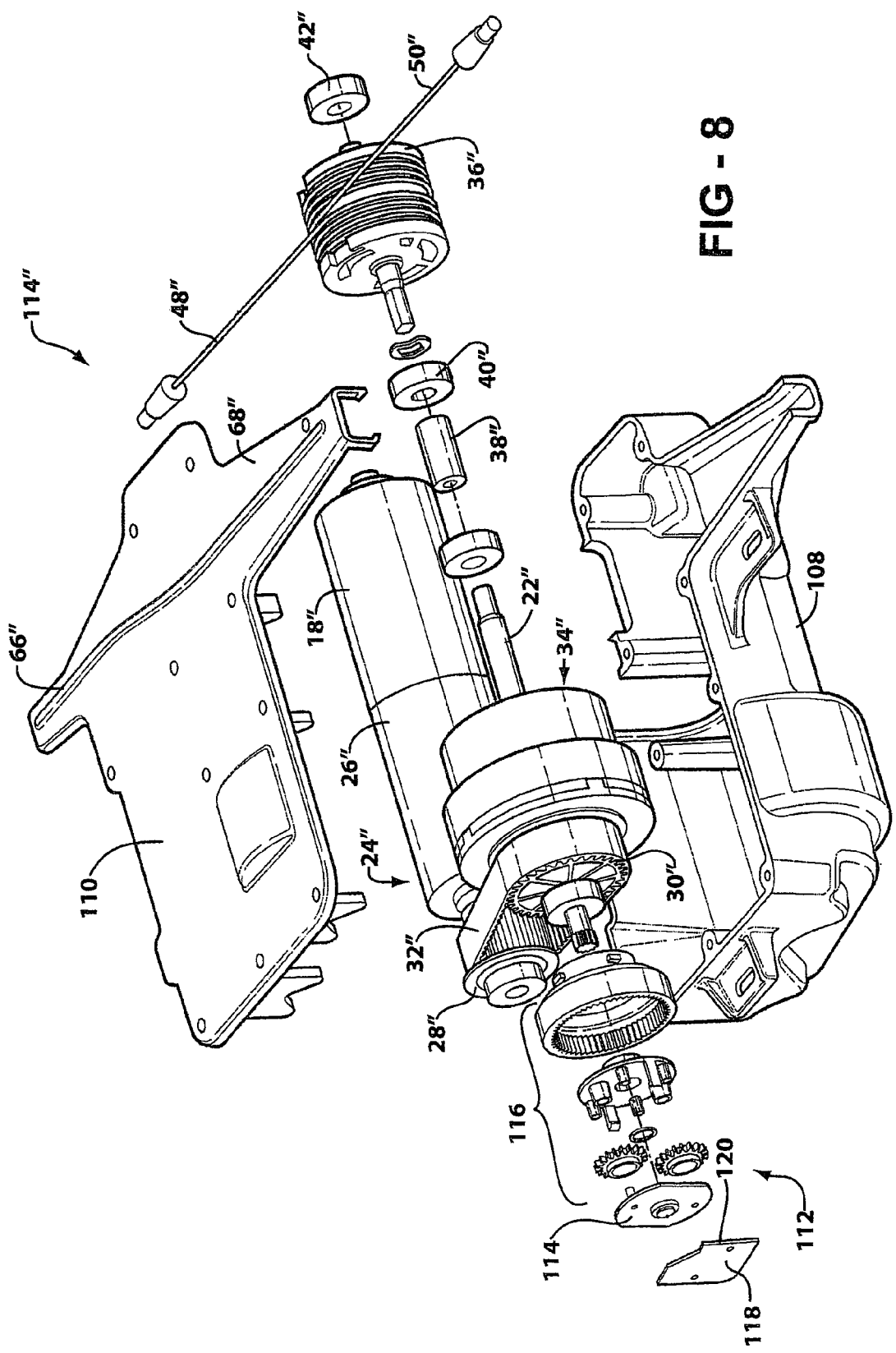
FIG. 8 is an exploded perspective view the sliding door drive assembly including an absolute position sensor according to a third embodiment of the invention.

Referring to FIG. 8, wherein like double primed reference numerals represent similar elements as those described above, in a third embodiment of the invention the motor 18", gear set 26", transmission 24", output shaft 22", and cable drum 36" are disposed between a housing 108 and cover 110. The housing 108 and cover 110 are fixedly secured together and include the support guides 66", 68" extending outwardly for guiding the first 48" and second 50" cables.

A position encoder, generally shown at 112, is operatively coupled to the sliding door drive assembly 14". The position encoder 112 includes a two pole magnet 114 operatively coupled to the output shaft 22" by a planetary gearbox 116 which is geared such that full travel of the sliding door 12" between its fully open position and fully close position corresponds to no more than one revolution of the two-pole magnet 114. The position encoder 112 also includes a printed circuit board 118 having four integrated Hall sensors 120. The circuit board 118 is adapted for mounting to the housing 108 and senses a rotational position of the two-pole magnet 114. Thus, the position encoder 112 is absolute in that it always knows the rotational position of the two-pole magnet 114 within its one revolution, even after a power disconnect during which the sliding door 12" is manually moved to a new position. The rotational position of the two-pole magnet 114 is then correlated to a position of the sliding door 12" between the fully open and fully close positions.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A sliding door drive assembly for a motor vehicle with an electric energy source and a sliding door, said sliding door drive assembly comprising:
   a motor electrically connected to the electric energy source, said motor converting electric energy into a rotating force;
   a transmission operatively connected to said motor for transmitting said rotating force to an output shaft;
   a cable drum fixedly secured to said output shaft for rotating with said output shaft;
   first and second cables wound about said cable drum in opposite directions, said first cable extending from said cable drum forward along the sliding door, said second cable extending from said cable drum rearward along the sliding door;
   support guides extending tangentially out from said cable drum to guide said first and second cables outwardly and away from said cable drum along a path; and
   front and rear pulley assemblies mounted to the motor vehicle and operatively coupled to said first and second cables between said sliding door drive assembly and the sliding door wherein the front pulley assembly includes a front pulley that is biased towards a front of the motor vehicle and wherein the rear pulley assembly includes a rear pulley that is biased towards a rear of the motor vehicle.

2. A sliding door drive assembly as set forth in claim 1 wherein each of said front and rear pulley assemblies further include a housing defining a cavity, wherein the pulley for each pulley assembly is disposed in said cavity and rotatably journaled on a shaft and wherein said first or second cable is wound around a portion of said pulley between said sliding door drive assembly and the sliding door, a pair of end caps receiving opposite ends of said shaft and slidably disposed in opposing grooves formed in said housing, and a pair of springs extending between said end caps and said housing biasing said front and rear pulleys forward and rearward respectively away from said cable drum.

3. A sliding door drive assembly as set forth in claim 2 including a center hinge fixedly secured to the sliding door.

4. A sliding door drive assembly as set forth in claim 3 wherein said center hinge includes forward and rearward cable terminals fixedly securing said first and second cables thereto.

5. A sliding door drive assembly as set forth in claim 4 wherein said transmission includes a gear set inline with said motor.

6. A sliding door drive assembly as set forth in claim 5 wherein said transmission includes a clutch for allowing selective manual movement of the sliding door.

7. A sliding door drive assembly as set forth in claim 6 wherein said clutch includes a pair of toothed plates.

8. A sliding door drive assembly as set forth in claim 7 wherein said transmission includes a belt extending between said gear set and said clutch.

9. A sliding door drive assembly as set forth in claim 8 including a cable drum housing covering said cable drum.

10. A sliding door drive assembly as set forth in claim 9 including a position sensor fixedly secured to said cable drum housing adjacent to said cable drum to identify the rotational position of said cable drum.

11. A sliding door drive assembly as set forth in claim 10 including a magnet coupled to said cable drum and sensed by said position sensor.

12. A sliding door drive assembly as set forth in claim 8 including an absolute position encoder operatively coupled to said sliding door drive assembly, said absolute position encoder including a two-pole magnet operatively coupled to said output shaft and a printed circuit board adapted to be mounted to said transmission and having four integrated Hall sensors for sensing a rotational position of said magnet, wherein fall travel of the sliding door between a fully open position and a fully close position corresponds to no more than one revolution of said magnet such that said rotational position of said magnet correlates to a position of the sliding door between said fully open and fully close positions.

13. A sliding door drive assembly as set forth in claim 1 wherein at least one of said support guides includes reinforced ribs.

14. A cable tensioner for tensioning a cable extending between and operatively coupled to a sliding door drive assembly and a sliding door, said cable tensioner comprising:
   a housing defining a cavity;
   a pulley disposed in said cavity and rotatably journaled on a shaft, and wherein the cable is wound around a portion of said pulley between the sliding door drive assembly and the sliding door;

a pair of end caps receiving opposite ends of said shaft and slidably disposed in opposing grooves formed in said housing and extending longitudinally, and a pair of springs extending between said end caps and said housing biasing said pulley longitudinally away from the sliding door drive assembly.

15. A cable tensioner as set forth in claim 14 wherein said housing includes an upper housing portion fixedly secured to a lower housing portion.

16. A cable tensioner as set forth in claim 15 wherein said upper and lower housing portions define a pair of openings for guiding the cable longitudinally into and out of said cavity.

17. A cable tensioner as set forth in claim 16 wherein each of said pair of end caps includes a post extending therefrom for axially receiving one end of one of said pair of springs.

18. A sliding door drive assembly for a motor vehicle with an electric energy source and a sliding door, said sliding door drive assembly comprising:

a motor electrically connected to the electric energy source, said motor converting electric energy into a rotating force;

a door drive transmission operatively connected to said motor for transmitting said rotating force to a door drive transmission output shaft;

a cable drum fixedly secured to said output shaft for rotating with said door drive transmission output shaft;

a housing covering a portion of said sliding door drive assembly;

first and second cables wound about said cable drum in opposite directions, said first cable extending from said cable drum forward along the sliding door, said second cable extending from said cable drum rearward along the sliding door;

an absolute position encoder including an encoder transmission, a two-pole magnet and a printed circuit board adapted to be mounted to said housing and having four integrated Hall sensors for sensing a rotational position of said magnet, wherein the encoder transmission is driven by the motor and the two-pole magnet is driven by the encoder transmission, and wherein the encoder transmission and the door drive transmission are related such that full travel of the sliding door between a fully open position and a fully close position corresponds to no more than one revolution of said magnet so that said rotational position of said magnet correlates to a position of the sliding door between said fully open and fully close positions.

19. A sliding door drive assembly as set forth in claim 18 wherein said encoder transmission is a planetary gearbox.

20. A sliding door drive assembly as set forth in claim 19 including a center hinge fixedly secured to the sliding door.

21. A sliding door drive assembly as set forth in claim 20 wherein said center hinge includes forward and rearward cable terminals fixedly securing said first and second cables thereto.

22. A sliding door drive assembly as set forth in claim 21 including forward and rearward cable tensioners mounted to said center hinge for tensioning said first and second cables.

23. A sliding door drive assembly as set forth in claim 22 wherein said door drive transmission includes a gear set inline with said motor.

24. A sliding door drive assembly as set forth in claim 23 wherein said door drive transmission includes a clutch for allowing selective manual movement of the sliding door.

25. A sliding door drive assembly as set forth in claim 24 wherein said clutch includes a pair of toothed plates.

26. A sliding door drive assembly as set forth in claim 25 wherein said door drive transmission includes a belt extending between said gear set and said clutch.

27. A sliding door drive assembly as set forth in claim 18 further comprising support guides extending tangentially out from said cable drum to guide said first and second cables outwardly and away from said cable drum along a path minimizing frictional forces, wherein at least one of said support guides includes reinforced ribs.

28. A sliding door drive assembly as set forth in claim 19 including front and rear pulley assemblies mounted to the motor vehicle and operatively coupled to said first and second cables between said sliding door drive assembly and the sliding door for tensioning said first and second cables.

29. A sliding door drive assembly as set forth in claim 28 wherein each of said front and rear pulley assemblies include a housing defining a cavity, a pulley disposed in said cavity and rotatably journaled on a shaft and wherein said first or second cable is wound around a portion of said pulley between said sliding door drive assembly and the sliding door, a pair of end caps receiving opposite ends of said shaft and slidably disposed in opposing grooves formed in said housing, and a pair of springs extending between said end caps and said housing biasing said front and rear pulleys forward and rearward respectively away from said cable drum.

* * * * *